United States Patent [19]

Stoneburner

[11] 4,257,052
[45] Mar. 17, 1981

[54] MOLDED ORIFICE PLATE ASSEMBLY FOR AN INK JET RECORDER AND METHOD OF MANUFACTURE

[75] Inventor: Leonard G. Stoneburner, Fairborn, Ohio

[73] Assignee: The Mead Corporation, Dayton, Ohio

[21] Appl. No.: 88,979

[22] Filed: Oct. 29, 1979

[51] Int. Cl.$^2$ ............................................. G01D 15/18
[52] U.S. Cl. ................................. 346/75; 346/140 R
[58] Field of Search .............................. 346/75, 140 R

[56] References Cited

U.S. PATENT DOCUMENTS

| | | | |
|---|---|---|---|
| 3,373,437 | 3/1968 | Sweet et al. | 346/75 |
| 3,949,410 | 4/1976 | Bassous et al. | 346/75 |
| 4,080,608 | 3/1978 | Stoneburner et al. | 346/75 |
| 4,106,976 | 8/1978 | Chiou et al. | 346/140 R X |
| 4,107,699 | 8/1978 | Kenworthy | 346/75 |
| 4,146,899 | 3/1979 | Paranjpe et al. | 346/75 |

Primary Examiner—George H. Miller, Jr.
Attorney, Agent, or Firm—Biebel, French & Nauman

[57] ABSTRACT

An orifice plate for use in an ink jet recorder is integrally cast with an orifice plate holder. The orifice plate is formed having a flat, tapered bottom portion containing at least one row of orifices and has sidewalls extending outwardly from the bottom portion at acute angles from horizontal. The orifice plate holder is formed from a castable plastic material which serves as a damping material. The holder is cast over and around the sidewalls of the orifice plate to define, with the bottom portion of the orifice plate, a portion of an ink supply manifold. The damping action of the holder isolates the orifice plate from spurious vibrations which could adversely affect the quality of printing from the ink jet recorder. Only the desired vibration from the stimulation transducer reaches the orifice plate. The mass and rigidity of the holder confines the traveling wave induced by the transducer to the orifice plate.

5 Claims, 3 Drawing Figures

MOLDED ORIFICE PLATE ASSEMBLY FOR AN INK JET RECORDER AND METHOD OF MANUFACTURE

BACKGROUND OF THE INVENTION

This invention relates to the field of ink jet printing devices, and more particularly to a formed traveling wave guide for an orifice plate for use in an ink jet printing device and a method for its manufacture.

In a typical ink jet printing device, a liquid reservoir is utilized to contain a printing ink with a multi-jet orifice plate being secured to the bottom of the reservoir. The orifice plate contains a plurality of very small diameter holes spaced along its length, usually in sets of rows. During operation, the ink under pressure is forced through these orifices and forms pendulant filaments which ultimately break up into streams of drops. It can be appreciated that in order to obtain uniform printing, these streams of drops must be of uniform size and spacing. In order to do this, means are usually provided for stimulating vibration of the orifice plate, either directly or indirectly, to cause motion in the ink supply which induces pressure waves along the filaments extending from the orifices so that drops of uniform size and spacing are produced.

The main problems associated with stimulating the orifice plate are spurious vibrations, undesired reflections, and loss of acoustical energy along the orifice plate. Many of these problems stem from the manner in which the orifice plate is secured to the ink manifold in an ink jet printing device. Common practice in the art has been either to solder or epoxy the orifice plate to the bottom of the manifold. However, in epoxying the plate to the manifold, it is very difficult to apply uniformly the adhesive bead of epoxy. This results in slight distortions in the orifice plate when it is pressed against the manifold and variations in the distance of separation between the two. These distortions and variations result in spurious vibrations and/or loss of acoustical energy.

Soldering also has drawbacks in that distortions, caused by the necessary heating to solder the connection, are introduced into the orifice plate. Since orifice plates are quite thin, they are easily warped or distorted. Such distortions are undesirable because they change slightly the relative position of the orifices from an otherwise straight alignment and result in misalignment problems with the charging and deflection mechanisms in the printing device and ultimately in poor quality printing.

Sweet et al, U.S. Pat. No. 3,373,437, disclose a unitary orifice plate and ink supply manifold construction of a rectangular, channel-shaped cross section and teach that either the wall containing the orifices or an opposite wall may be vibrated to induce uniform drop formation. However, because of the direct connection of both of these walls to the relatively thin sidewalls, it is apparent that vibrations will be induced in the sidewalls causing spurious vibrations in the ink supply in the manifold and adversely affecting the uniformity of filament lengths. This irregularity of filament lengths adversely affects printing quality.

Several attempts have been made in the art to overcome the problems of bonding orifice plates to ink supply manifolds. For example, Kenworthy, U.S. Pat. No. 4,107,699, teaches use of a trenched orifice plate having a thin central section with thicker sections on either side forming acoustical barriers to undesired vibrations. However, fabrication of such a trenched plate requires several steps including photofabrication, plating, and/or etching of the structure. Paranjpe et al, U.S. Pat. No. 4,146,899, teach an orifice plate having sidewalls which are backed by acoustically absorbent material to prevent the propagation of spurious vibrations from the orifice plate to the sidewalls. However, the effectiveness of that structure in preventing undesirable vibrations is quite dependent on the nature and quality of the bonding and surface to surface contact of the sidewalls with the backing layer.

Accordingly, the need still exists in the art for a structure which is simple to manufacture and which contains the acoustic energy applied to the orifice plate within it independently of, and substantially unaffected by, the bond between the orifice plate and ink supply manifold.

SUMMARY OF THE INVENTION

The present invention avoids the problems of the prior art by providing an orifice plate which is integrally cast with an orifice plate holder. The orifice plate is formed with a flat bottom section having two sidewalls extending upwardly and outwardly therefrom at angles of about 30° to 45° from the horizontal. The bottom section of the orifice plate contains at least one row of uniformly spaced orifices along its length.

The orifice plate holder is preferably formed of a castable, curable plastic material which, because of its greater mass and stiffness, serves as a vibration damping material. The orifice plate holder may also serve to define a portion of the ink supply manifold. The orifice plate holder is cast over and around the two sidewalls extending from the orifice plate and forms generally vertical walls at the points where the two sidewalls bend upwardly from the bottom portion of the orifice plate. The casting step can be carried out using known techniques to form an integral structure. The abrupt change in mass and stiffness from the relatively thin and flexible bottom portion of the orifice plate to the walls of the orifice plate holder forms an acoustical barrier and confines the applied acoustical energy to the orifice plate.

As can be seen, it is an object of the present invention to provide an improved orifice plate holder which is easy to manufacture and which contains the acoustical energy applied to the orifice plate it without transferring that energy to other portions of the printing device and avoids the creation of undesirable vibrations and reflections. This and other objects and advantages of the invention will become apparent from the following description, the accompanying drawings, and the appended claims.

DESCRIPTION OF THE PREFERRED EMBODIMENTS

Figure 1:
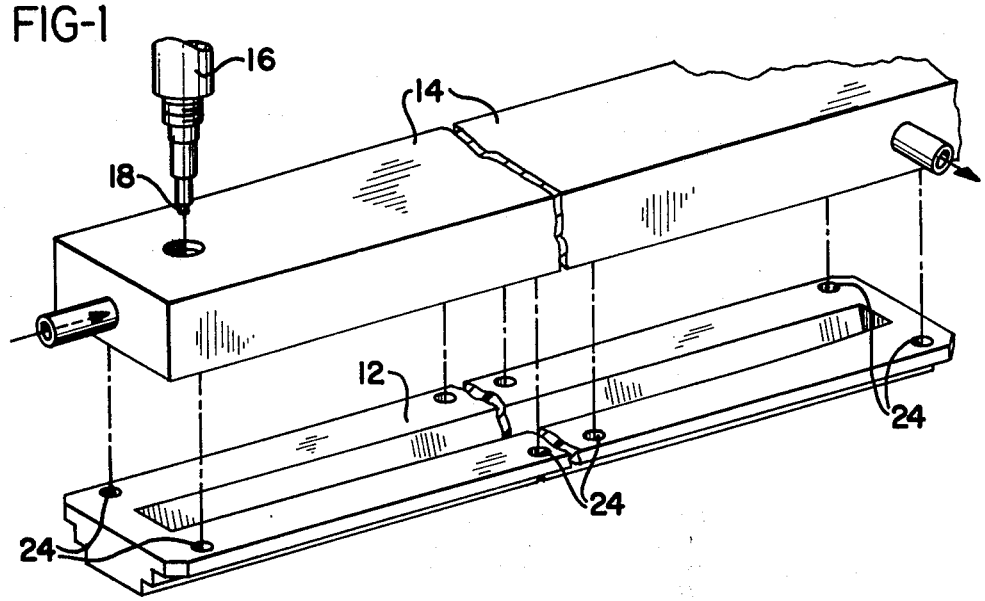
FIG. 1 is an expanded, broken perspective view of the present invention illustrating the orifice plate assembly and ink supply manifold.
Figure 2:
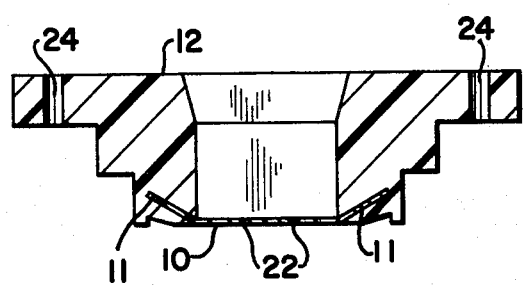
FIG. 2 is a cross-sectional end view of the orifice plate and cast orifice plate holder.

The orifice plate assembly as illustrated in the present invention is intended for use in an ink jet printing device of the general type disclosed, for example, in Van Breemen et al, U.S. Pat. No. 4,080,607 and Sweet et al, U.S.

Pat. No. 3,373,437. The basic principles of operation of ink jet printing devices are well known and will not be discussed in detail herein. For such detail, reference should be made to the above-mentioned patents.

Referring now to the Figures, orifice plate 10 having upwardly extending sidewalls 11 is shown as integrally cast to orifice plate holder 12 which is secured to the bottom of ink supply manifold 14 by suitable means such as screws (not shown). A mechanical stimulation transducer device 16 vibrates orifice plate 10 at high frequency to produce traveling wave vibrations along the length of the orifice plate. In a known manner, tip 18 of stimulation device 16 engages the upper surface of the flat bottom portion of orifice plate 10 at stimulation point 20 causing vibrational waves to move along the length of the plate from the end engaged by tip 18 to the end remote therefrom. As is known in the art, the high frequency vibration of the orifice plate in this manner causes generation of streams of drops of ink from filaments extending from orifices 22 in the bottom portion of orifice plate 10.

However, because orifice plate 10 is integrally cast with orifice plate holder 12, the problems of spurious vibrations which plagued the prior art are not present. The greater mass of the orifice plate holder serves to damp out any undesirable vibrations and confines the traveling waves produced by stimulation device 16 to the flat bottom portion of orifice plate 10. In this manner, filaments and drops of ink are uniformly generated permitting greater quality in the final printed product.

Figure 3:
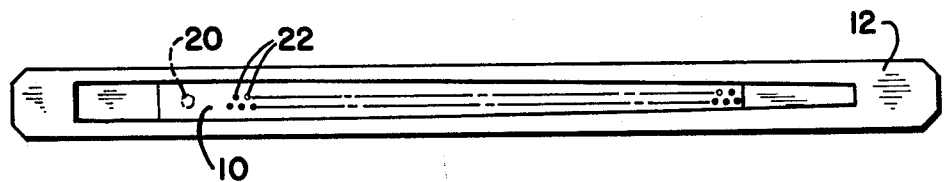
FIG. 3 is a top plan view of the orifice plate assembly.

The orifice plate of the present invention is fabricated from a thin metal strip such as a 0.008 inch thick beryllium copper alloy plated with a thin nickel layer although other metals or materials such as a rigid plastic may be used. The orifice plate may be initially flat and be formed by bending its sidewalls upwardly. Although the exact angle of bend is not critical, it has been found that angles in the range of about 30 to 45 from horizontal result in a satisfactory structure. Additionally, during the bending operation, the sidewalls are preferably bent to produce a tapered flat portion as illustrated in FIG. 3. This is to compensate for the dissipation of accoustical energy as the waves traverse the length of the orifice plate. Orifices 22 may be formed in a manner known in the art such as by drilling or etching. Preferably, the orifices are formed prior to the bending and molding operations.

Orifice plate holder 12 can be formed of any suitable material for damping vibrations in sidewalls 11 of orifice plate 10. Examples of suitable materials include polyurethanes, epoxy casting resins, and polyacrylates. Suitable casting resins which can be used in the practice of the invention include Stycast 2058 manufactured by Emerson & Cuming, Inc. and Epoxical C-301 Thick Section Casting Resin manufactured by United States Gypsum Corp. All of these polymers are available as liquids which can be easily poured into molds and quickly cured in place. In forming the orifice plate assembly, the bent orifice plate is placed in the bottom of a mold, and a curable plastic resin material is poured over and around the sidewalls and ends thereof. The resin can then be cured in a known manner by the application of heat, light, ionizing radiation, or the addition of a chemical curing agent. When cured, the cast resin integrally locks the orifice plate into position within the assembly.

Once cast in place in the orifice plate holder, the entire assembly is then secured to the bottom of ink supply manifold 14 such as by screws or bolts inserted through holes 24 in orifice plate holder 12 and corresponding threaded holes (not shown) on the underside of ink manifold 14. This assembly is then, in turn, secured in an ink jet printing device of the type disclosed in the above-mentioned patents. Because the vibrations resulting from stimulation device 16 are confined to the lower flat portion of orifice plate 10 by the damping action of orifice plate holder 12, no undesired vibrations are transmitted to the ink supply either through the sidewalls of orifice plate holder 12 or through any connecting means to ink manifold 14. In this way, uniform filament lengths are produced and uniformly sized and spaced streams of ink drops are formed.

What is claimed is:

1. An orifice plate assembly for use in an ink jet printing device comprising, an orifice plate holder having generally vertical side and end walls, and a thin, elongated orifice plate having at least one row of orifices therein, said orifice plate having a generally flat bottom portion and sidewalls extending outwardly therefrom at an acute angle from the horizontal, said sidewalls of said orifice plate being embedded in said sidewalls of said orifice plate holder forming an integral assembly therewith and defining a liquid supply reservoir, said orifice plate holder being of a relative mass substantially to prevent the formation of spurious vibrations and confine the acoustical energy applied to said orifice plate to the bottom portion thereof.

2. An orifice plate assembly for use in an ink jet printing device comprising, a thin, elongated orifice plate having at least one row of orifices therein, said orifice plate having a generally flat bottom portion with sidewalls extending outwardly therefrom at an acute angle from the horizontal, and vibration damping means engaging the inner and outer surfaces of said sidewalls substantially to prevent the formation of spurious vibrations and confine acoustical energy applied to said orifice plate to the bottom portion thereof, said vibration damping means in combination with said bottom portion of said orifice plate forming a liquid supply reservoir for ink in an ink jet printing device.

3. The orifice plate assembly of claims 1 or 2 in which said sidewalls extend upwardly at an angle of between about 30° and about 45° from the horizontal.

4. A process for manufacturing an orifice plate assembly for use in an ink jet printing device comprising the steps of:

(a) bending the edges of a thin elongated orifice plate upwardly at an acute angle from the horizontal to form a relatively flat bottom portion of said orifice plate with a pair of sidewalls extending therefrom, (b) placing said orifice plate into a mold and pouring a curable plastic resin material over and around said sidewalls to form an orifice plate holder which integrally locks said orifice plate to said orifice plate holder, and (c) curing said plastic resin material.

5. The process of claim 4 in which the edges of said orifice plate are bent upwardly at an angle of between about 30° and about 45° from the horizontal.

* * * * *